United States Patent [19]

Fortuna et al.

[11] Patent Number: 4,552,612

[45] Date of Patent: * Nov. 12, 1985

[54] INERTIAL SPIN WELDING OF THERMOPLASTIC AND THERMOPLASTIC COATED CONTAINER PARTS

[75] Inventors: Vincent E. Fortuna, Huntington Beach, Calif.; Donald N. MacLaughlin, Midland, Mich.

[73] Assignee: Cosden Technology, Inc., Dallas, Tex.

[*] Notice: The portion of the term of this patent subsequent to Jun. 7, 2000 has been disclaimed.

[21] Appl. No.: 465,135

[22] Filed: Feb. 9, 1983

Related U.S. Application Data

[63] Continuation of Ser. No. 415,126, Sep. 7, 1982, Pat. No. 4,386,999, which is a continuation-in-part of Ser. No. 234,344, Feb. 3, 1981, abandoned.

[51] Int. Cl.[4] .................... B23K 27/00; B29C 27/08; B29D 23/03
[52] U.S. Cl. .................... 156/494; 156/580; 425/111; 425/DIG. 14; 156/73.5; 156/165; 156/294; 156/304.2
[58] Field of Search ............... 156/494, 580, 73.5, 156/165, 294, 304.2, 358, 360, 446, 475, 492, 496, 583.3, 160, 397, 296; 198/651; 294/94, 97; 425/111, 523, 353, 326.1, 457, 468, DIG. 14, DIG. 59

[56] References Cited

U.S. PATENT DOCUMENTS

| Re. 29,448 | 10/1977 | Brown et al. | 156/73.5 |
|---|---|---|---|
| 1,637,708 | 8/1927 | Porter | 425/DIG. 14 |
| 3,502,525 | 3/1970 | Wood | 156/165 |
| 4,090,898 | 5/1978 | Tuskos | 156/580 |
| 4,107,249 | 8/1978 | Murai et al. | 264/68 |
| 4,186,169 | 1/1980 | Black | 425/111 |
| 4,199,183 | 4/1980 | Hecker | 294/97 |
| 4,386,999 | 6/1983 | Fortuna et al. | 156/494 |

*Primary Examiner*—Edward Kimlin
*Assistant Examiner*—L. Falasco
*Attorney, Agent, or Firm*—Michael J. Caddell; M. Norwood Cheairs

[57] ABSTRACT

A thermoplastic container bottom is inertially spin welded into the interior of a cylindrical container body of paperboard internally lined with a layer of thermoplastic material. A body supporting mandrel has an expansible body engaging portion which is inserted into the body and subsequently expanded to define a cylindrical surface of a diameter exactly equal to that of the specified internal diameter of the body. A seating member at the end of the body supporting mandrel establishes the depth to which the container bottom is inserted into the body and is provided with a low-friction projecting resilient member which contacts the rotating bottom.

9 Claims, 16 Drawing Figures

INERTIAL SPIN WELDING OF THERMOPLASTIC AND THERMOPLASTIC COATED CONTAINER PARTS

CROSS REFERENCE TO RELATED APPLICATIONS

This application is a continuation of a prior copending application, Ser. No. 415,126, filed Sept. 7, 1982 by Vincent E. Fortuna and Donald N. MacLaughlin for "Inertial Spin Welding of Thermoplastic and Thermoplastic Coated Container Parts" now U.S. Pat. No. 4,386,999; which prior copending application is a continuation-in-part of an original application (now abandoned), Ser. No. 234,344, filed Feb. 13, 1981, by Vincent E. Fortuna and Donald N. MacLaughlin, entitled "Inertial Spin Welding of Thermoplastic and Thermoplastic Coated Container Parts".

BACKGROUND OF THE INVENTION

U.S. Pat. No. Re. 29,448 discloses methods and apparatus for inertial spin welding of thermoplastic container parts. As disclosed in that patent, two axially mating thermoplastic container parts are respectively mounted upon axially aligned mandrels. One of the mandrels is temporarily coupled to a rotary drive means to bring that mandrel and the container part carried by the mandrel up to a predetermined rotative speed, at which time the rotary drive is disengaged, the rotary inertia developed maintaining the mandrel in rotation after the drive is disengaged. The two mandrels are then moved toward each other and the two container parts carried by the respective mandrels seat with each other. The friction developed by the relatively rotating container part heats the plastic material as it simultaneously brakes the relative rotation to melt the material to fuse the parts to each other when the relative rotation ceases and the parts are permitted to cool.

In U.S. Pat. No. Re. 29,448, the two parts being welded were both of a thermoplastic material. This fact is worthy of note in that in order to generate the frictional heat required to melt the plastic material, the mating parts of the container must fit with each other with an interference fit. Where both parts are formed from the same thermoplastic material, the achievement of an interference fit of this type is not especially difficult in that the part dimension is quite accurately established in the forming machine and any subsequent dimensional changes due to thermal expansion or contraction where the parts are stored for any substantial period of time prior to assembly normally affects both of the parts to substantially the same degree.

In recent years, there has been substantial usage of containers in which the container body or side wall is formed primarily of paperboard or cardboard, usually sealed at the opposite ends by metal tops and bottoms. Cans for motor oil and frozen orange juice are typical examples of containers of this type. Where a paperboard container body is employed, it is necessary to coat or line the interior of the paperboard body with some liquid tight material, thermoplastic materials being frequently used for this purpose.

Where the paperboard container body is lined with thermoplastic material, it has been proposed to employ a thermoplastic material for the container bottom which has led to the discovery that such bottoms could be spin welded to the container body inasmuch as the container body has a layer of thermoplastic material on its interior surface. However, difficulties have been encountered in forming and maintaining the thermoplastic coated paperboard bodies within dimensional tolerances acceptable for such a spin welding operation. In order to apply the thermoplastic liner to the paperboard, the thermoplastic is normally heated in order to bond it to the paperboard and subsequent cooling tends to shrink the material so that the container becomes undersized. Non-uniform shrinkage in storage also tends to occur, and the paperboard containers may, during preassembly handling and conveying operations, become slightly out of round.

The present invention is especially directed to methods and apparatus enabling the spin welding of thermoplastic bottoms to thermoplastic lined paperboard containers.

SUMMARY OF THE INVENTION

In accordance with the present invention, a mandrel for supporting a thermoplastic lined cylindrical container body during a spin welding operation is provided with an expansible container body engaging assembly which, in a contracted position, can be axially inserted into the container body. Body engaging members in the form of circumferential segments of a cylindrical surface are normally maintained in a contracted position, as by a circumferential garter spring. Inclined internal cam surfaces on each of the segmental members are slidably engaged by a complementarily inclined actuating cam which, upon axial movement relative to the segmental members radially expands them outwardly to an expanded position. In this expanded position, the outer cylindrical surfaces of the segmental members are accurately located to define a cylindrical surface of a diameter precisely equal to the specified internal diameter of the body for spin welding purposes.

A container bottom of thermoplastic material is formed with an axially upwardly projecting peripheral flange whose major outer surface is dimensioned for the desired interference fit with the specified internal diameter of the can body. The outer upper edge of this flange is tapered upwardly and inwardly so that the flange can be pressed up into the interior of the container body with the desired press fit.

A seating member is mounted at the lower end of the body carrying mandrel to establish the depth to which the container bottom is inserted into the can body. The seating member is provided with a low-friction resilient member which normally projects axially downwardly below the bottom of the seating member. In the assembly operation, the bottom is first elevated by its mandrel into contact with this resilient member, and the bottom carrying mandrel is then engaged with the rotary drive to bring the bottom mandrel up to rotary speed.

Other objects and features of the invention will become apparent by reference to the following specification and to the drawings.

BRIEF DESCRIPTION OF THE DRAWINGS

FIGS. 10-1 through 10-7 are schematic diagrams showing sequential steps in the spin welding operation performed by the machine.

Figure 1:
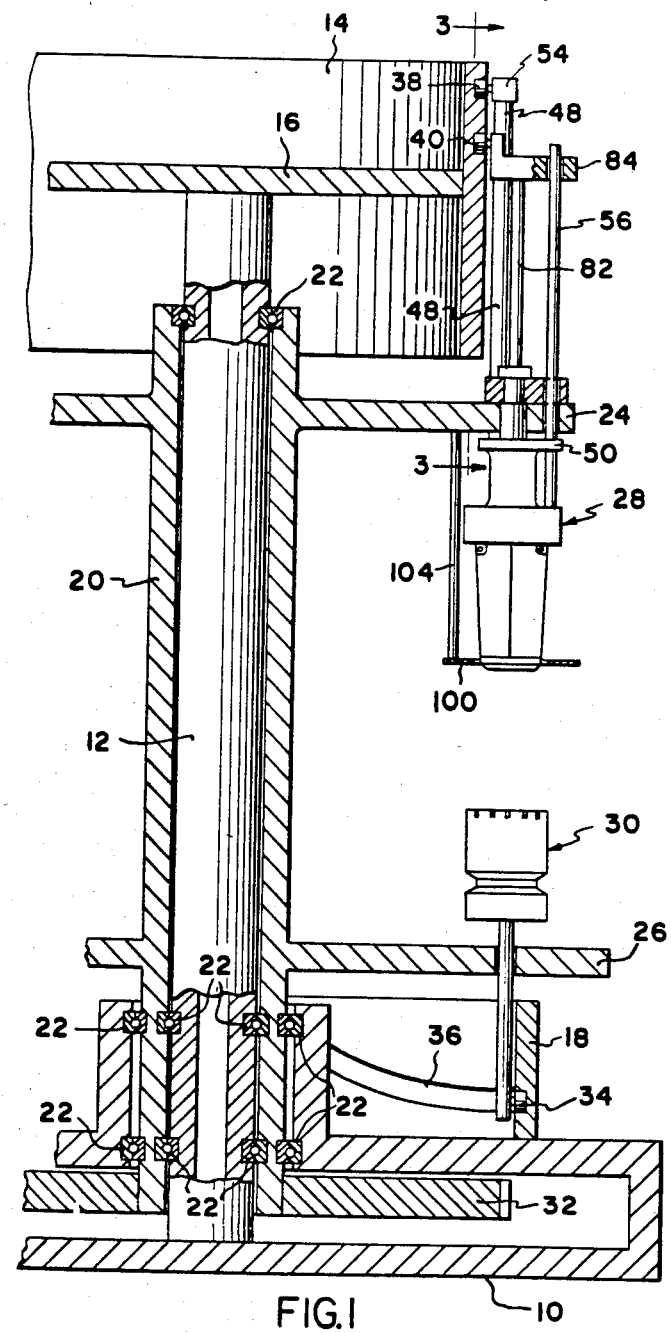
FIG. 1 is a cross-sectional view, with certain parts omitted or broken away, of an inertial spin welding machine embodying the present invention.

The machine of the present invention, taken as a whole, utilizes many of the features disclosed in U.S. Pat. No. Re. 29,448, the disclosure of which is hereby incorporated by reference. In the following description, and in the drawings, many parts of the present machine are illustrated in a simplified form and described only generally inasmuch as similar parts and structures are shown and described in detail in U.S. Pat. No. Re. 29,448, to which reference may be had if further detail is desired.

Referring first to FIG. 1, the stationary frame of the present machine includes a base designated generally 10 which fixedly supports a vertically extending central post 12. A cylindrical cam track 14 is fixedly mounted as by a plate 16 upon the upper end of post 12 in coaxial relationship with the vertical axis of the post. A second cylindrical cam track 18 is fixedly mounted on base 10. All of the structure described thus far constitutes the stationary frame of the machine, all of the remaining shown in FIG. 1 is mounted for rotation about the axis of vertical post 12, only a portion of the rotatable structure being shown.

The rotary structure includes a central sleeve 20 mounted upon post 12 for rotation relative to the post as by a series of bearings 22, sleeve 20 carrying upper and lower tables 24, 26 fixedly attached to the sleeve.

In FIG. 1 there is shown only a single set of mandrels which include an upper mandrel assembly designated generally 28, supported generally from upper table 24, and a lower mandrel assembly designated generally 30 carried generally by lower table 26. In the actual machine, there are several sets of upper and lower mandrels disposed symmetrically about the axis of the machine, this arrangement being shown in U.S. Pat. No. Re. 29,448 previously referred to.

A drive gear 32 is fixedly secured to the lower end of sleeve 20 to drive the sleeve and the various parts mounted thereon in rotation about post 12. As the sleeve and upper and lower tables 34 and 26 are rotated, the upper and lower mandrels 28 and 30 move in a circular path around central post 12. During this movement, a roller 34 on lower mandrel assembly 30 moves along a groove 36 in lower cam track 18 to raise and lower, lower mandrel assembly 30 at appropriate points in its cyclic movement around post 12. A similar roller 38 engaged in a similar groove in upper cam track 14 likewise vertically raises and lowers upper mandrel assembly 28, while a second roller 40 engaged with upper cam track 14 operates an actuating device to be described below. The vertical reciprocation of the mandrel assemblies is quite similar to that described in detail in U.S. Pat. No. Re. 29,448, for which reference may be had for further details.

Further details of upper mandrel assembly 28 are shown in FIGS. 2-5.

Figure 2:
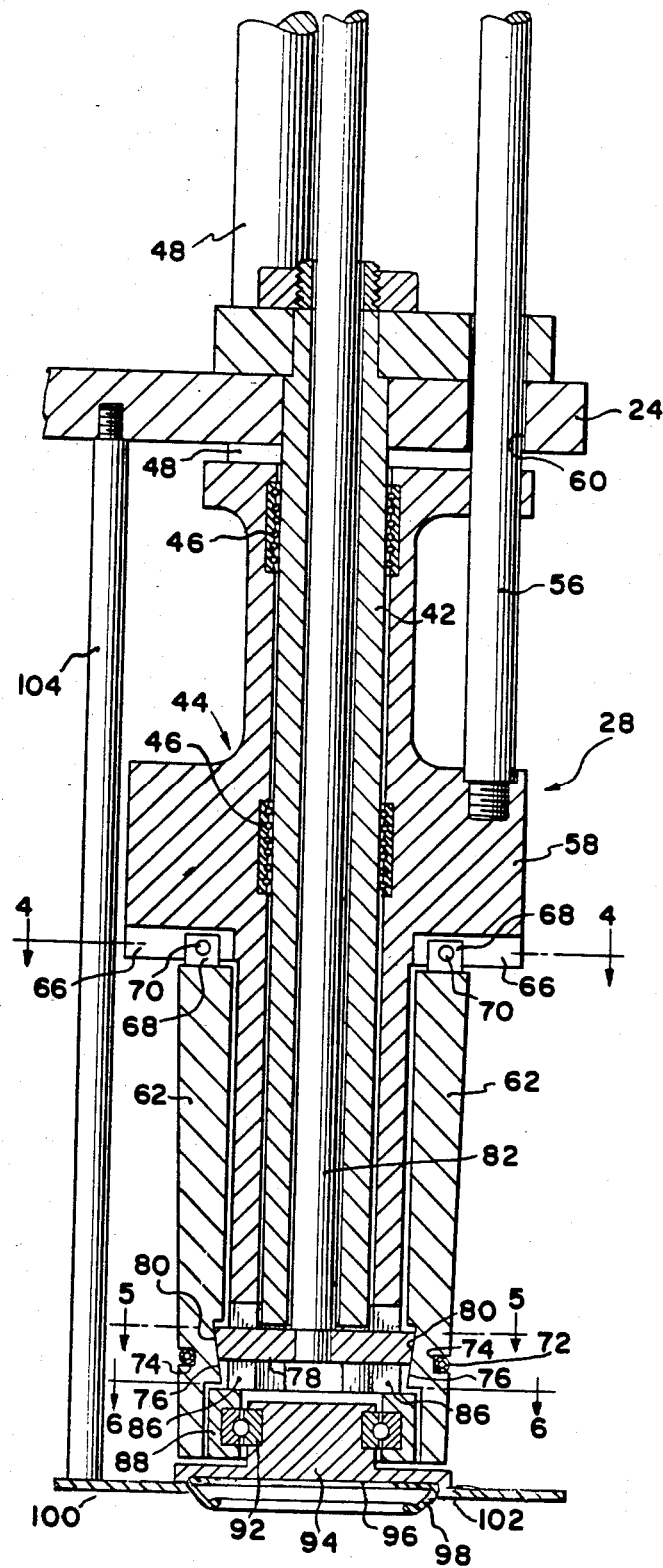
FIG. 2 is a detail cross-sectional view of an upper mandrel of the machine in FIG. 1.

Referring first to FIG. 2, upper mandrel assembly 28 includes a rigid hollow sleeve 42 which is fixedly secured at its upper end to upper table 24. A housing designated generally 44 is mounted on the exterior of sleeve 42, as by slide bearings 46 for vertical reciprocatory movement on sleeve 42. Housing 44 is suspended by a pair of support rods 48, see FIG. 3, which are fixedly secured at their lower ends to flange 50 of housing 44 and pass upwardly through openings 52 in upper table 24. A cross member 54 is fixedly secured to the upper ends of support rods 48 and serves as a mounting for cam roller 38 which, as best seen in FIG. 1, rides in the upper groove of cam track 14. Housing 44 is thus suspended by support rods 48 from cam roller 38 and the housing moves upwardly and downwardly in accordance with the path followed by roller 38.

Returning now to FIG. 2, a vertical guide rod 56 is fixedly secured at its lower end to a second flange 58 on housing 44 and projects upwardly through an opening 60 in upper table 24 to vertically guide housing 44 in movement.

Figure 4:
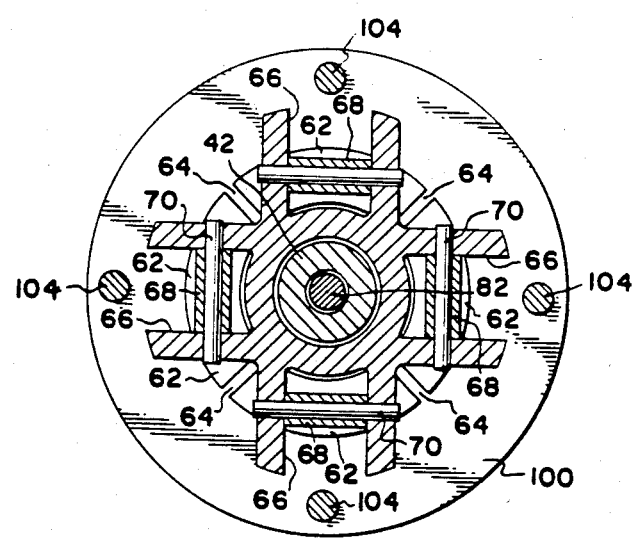
FIG. 4 is a detail cross-sectional view taken on the line 4—4 of FIG. 2.
Figure 5:
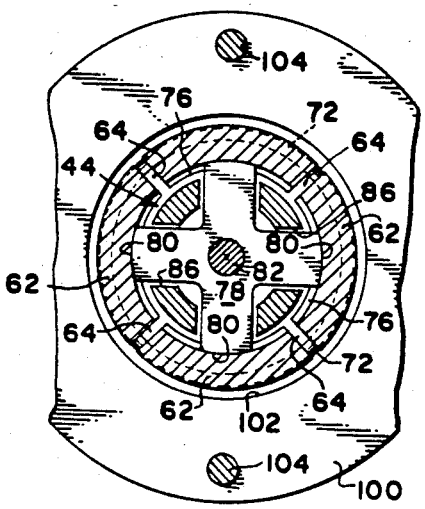
FIG. 5 is a detail cross-sectional view taken on the line 5—5 of FIG. 2.
Figure 6:
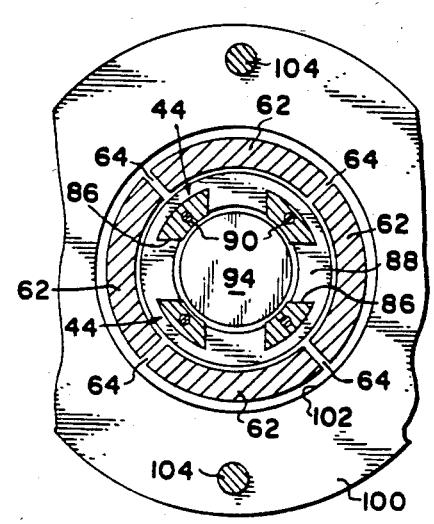
FIG. 6 is a detail cross-sectional view taken on the line 6—6 of FIG. 2.

Four container body engaging members 62 are pivotally suspended from the lower side of flange 58. As best seen in FIGS. 4-6, the four engaging members 62 have the conformation of a circumferential segment of a hollow cylinder, the circumferential extent of each body engaging segment 62 being slightly less than one-quarter of the overall circumference so that spaces such as 64 between the axially extending edges of adjacent members 62 enable the members to be moved radially inwardly relative to one another to an outer diameter less than that of their outer surfaces. The outer diameter of the members 62 as viewed in FIGS. 4, 5 and 6 is equal (with a slight negative tolerance) to the specified internal diameter of a cylindrical container body to be received upon the members 62. This particular diameter is of substantial importance to the rpesent invention and will be discussed in further detail below.

Figure 3:
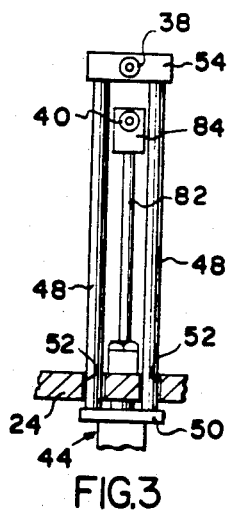
FIG. 3 is a detail cross-sectional view taken on the line 3—3 of FIG. 1.

Referring now particularly to FIGS. 2 and 3, it is seen that four radial slots 66 are cut into the underside of housing flange 58, each slot, as best seen in FIG. 4, overlying one of the body engaging members 62. A projection 68 at the upper end of each member 62 passes upwardly through the slot 66 and a horizontally extending pivot pin 70 pivotally suspends each member 62 from housing 44 at the underside of flange 58. Pivot pins 70 all line in a common horizontal plane and, as best seen from FIG. 4, are so oriented that they are all tangent to a common circle centered on the central vertical axis of sleeve 42. A garter spring 72 is mounted within circumferential grooves 74 on the outer sides of each of the members 62 and resiliently biases the lower ends of the four members 62 radially inwardly toward each other so that the outer surfaces of members 62, as viewed in FIG. 2, are normally inclined downwardly and inwardly toward each other.

Referring now particularly to FIG. 2, a downwardly and inwardly inclined cam surface 76 is formed on the interior side of each member 62 near the lower end of the member. A cam member 78 having cam surfaces 80 of complementary inclination is located between the member 62 and is fixedly mounted to the lower end of an actuating rod 82 which passes freely centrally upwardly through sleeve 42 and is secured at its upper end (FIG. 3) to a bracket 84 which mounts cam roller 40. As best seen in FIG. 1, bracket 84 also slidably receives the upper end of guide rod 56.

Referring now particularly to FIG. 5, it is seen that cam member 78 is of a cross-shaped configuration when viewed from above, with cam surfaces 80 being located at the ends of each of the four arms of the cross-shaped configuration. The lower portion of housing 44 is provided with four radial slots 86 through which the arm portions of cam members 78 freely project.

Referring now particularly to FIGS. 2 and 6, seating member 88 is fixedly mounted to the lower end housing 44 by means such as welding or as by screws 90 (FIG. 6). A recess 96 is formed on the lower side of seating member 88 and a resilient member 98, whose purpose will be described in greater detail below is fixedly mounted in and projects downwardly from the recess. Member 98 can be compressed to lie entirely within recess 96. In order to reduce friction, member 98 may be made from or coated with a low-friction material such as polytetrafluoroethylene (Teflon).

An ejector plate 100 having a circular opening 102 is mounted at the lower end of a plurality of support rods such as 104, support rods 104 being fixedly mounted in table 24.

Figure 7:
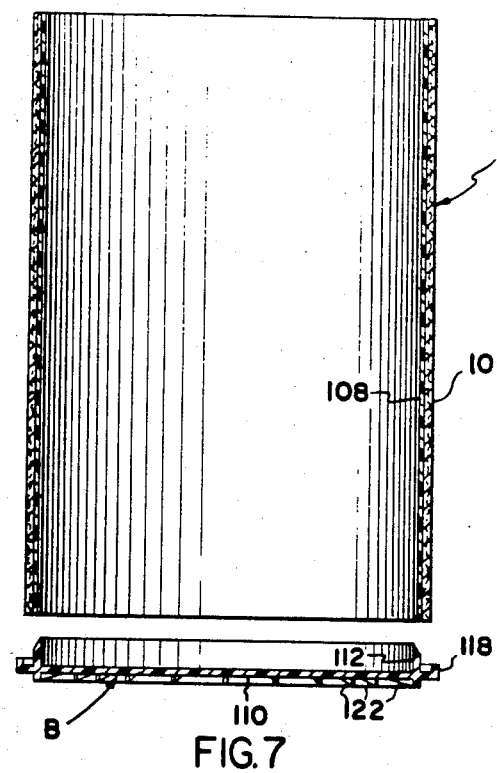
FIG. 7 is a cross-sectional view of a container body and container bottom to be spin welded by the machine of FIG. 1.
Figure 8:
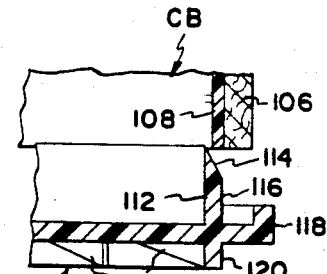
FIG. 8 is an enlarged detail cross-sectional view of the container bottom and body indicating relative dimensions.
Figure 9:
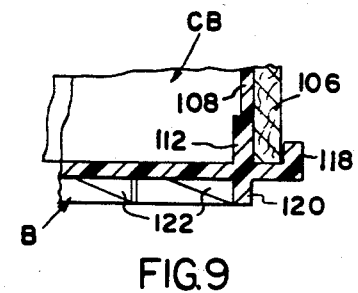
FIG. 9 is a detail cross-sectional view showing the container bottom and body welded to each other.

Referring now to FIGS. 7-9, in those figures are shown cross-sectional views of a container body and bottom which are to be spin welded by the apparatus described above. Referring first to FIG. 7, a container body CB of cylindrical shape is shown in cross-section. The container body CB is formed by a cylindrical tube of paperboard 106 whose interior surface is lined with a moisture barrier liner or coat of a suitable thermoplastic material 108 such as polyethylene, polystyrene, or polypropylene. A container bottom B is formed of the same thermoplastic synthetic plastic material with a bottom 110 and an integral upwardly projecting peripheral flange 112. As best seen in the enlarged view of FIG. 8, flange 112, is formed with a downwardly and outwardly inclined surface at its upper end, because in order to perform the desired spin welding operation, there must be an interference fit between the inner surface of the thermoplastic layer 108 on container body CB and the outer surface 116 of flange 112. The inclined surface 114 enables the flange to be pushed axially inwardly into the container interior with a shoehorn-like action.

A second upwardly projecting flange 118 preferably is located upon the container bottom B to protect the lower edge of the paperboard portion of the container body, as best illustrated in FIG. 9, which shows the bottom and container body at the conclusion of the spin welding operation.

The container bottom B preferably is provided with a downwardly projecting flange 120 and a plurality of radially extending ribs 122 extend from the inner side of flange 120 to the bottom surface of bottom B to provide a rotary drive coupling between the bottom B and lugs formed on the upper surface of lower mandrel 30.

THE OPERATION

A general sequence of operation of the apparatus described above is illustrated schematically in FIGS. 10-1 through 10-7.

Figures 1, 2, 3, 4, 5, 6, 7, 10:
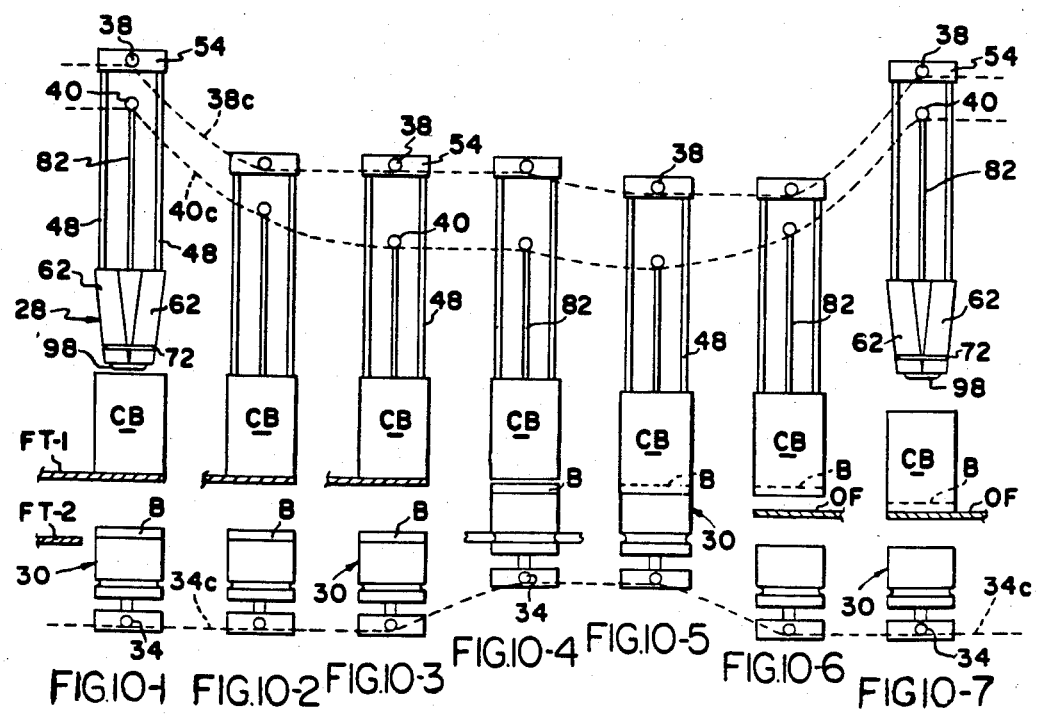

The initial step in the operation is shown in FIG. 10-1 in which upper mandrel 28 is raised to its maximum elevation and cam actuating rod 82 is likewise raised to its maximum elevation to position cam member 78 relative to body engaging members 62 in the position shown in FIG. 2. As previously described, vertical positioning of upper mandrel 28 and cam actuator 82 is controlled by rollers 38 and 40 respectively, these rollers riding in grooves in the stationary upper cam track 14 (FIG.1) to raise and lower the respective rollers as the upper and lower mandrels are rotated about the axis of central post 12 of the machine frame. The broken lines 38C and 40C in FIGS. 10-1 through 10-7 approximately indicate the configuration of the cam tracks upon which rollers 38 and 40 ride. Similarly, the broken line 34C indicates the cam track upon which the lower mandrel positioning roller 34 moves.

With cam rod 82 and cam 78 in their maximum elevated position relative to body engaging segments 62, garter spring 72 has radially contracted the lower ends of segments 62 so that the cylindrical outer surfaces of segments 62 in FIG. 10-1 approximate a downwardly convergent frustoconical surface having an outside diameter at its lower end substantially less than the internal diameter of a container body CB.

In FIG. 10-1, a container body CB is located on a feed table FT-1 in underlying coaxial alignment with upper mandrel 28. A container bottom B has been fed from a second feed table FT-2 onto the upper end of lower mandrel 30.

In FIG. 10-2, upper mandrel 28 has been lowered to insert the container body engaging segments 62, fully into the interior of the container body CB. During this lowering movement of upper mandrel 28, cam actuating rod 82 is simultaneously lowered so that no relative vertical movement between actuating rod 82 and upper mandrel 28 occurs, and the body engaging segments 62, located in the interior of container body CB in FIG. 10-2 are thus still in the radially contracted position as in FIG. 10-1.

In FIG. 10-3, actuating rod 82 has been moved downwardly relative to upper mandrel 28. Referring briefly to FIG. 2, the lowering action of rod 82 illustrated in the transition from FIGS. 10-2 to 10-3 causes cam member 78 to move downwardly from the position shown in FIG. 2, this downwardly movement of cam member 78 causing its inclined cam surfaced 80 to slide downwardly along the inclined surfaces 76 on body engaging members 62 to pivot the members 62 radially outwardly about their respective pivots 70 into full contact with the interior wall of conatiner body CB.

As previously described above, the characteristics of container body CB and the process by which the container body is manufactured are such that at the time the container body is fed into the spin welding apparatus, the internal diameter of the body is normally somewhat smaller than its specified diameter. The container bottom B, on the other hand, is quite accurately formed to its specified diameter and maintains this diameter quite accurately after its formation. In order that the spin welding of the container body to its bottom may be efficiently performed, it is essential that the container body be at its specified internal diameter at the time the container bottom is inserted into the body so that the desired interference fit between these two parts, one of which is rotating relative to the other, will generate the desired amount of frictional heat to fuse the opposed thermoplastic surfaces to each other.

As described above, the outer surfaces of the body engaging members 62 of upper mandrel 28 are accuratley machined to a diameter corresponding (with a slight negative tolerance) to the specified internal diameter of container body CB. The radial expansion of body engaging members 62, by actuation of cam rod 82 after the members have been inserted into the container body, is likewise accurately regulated so that at the conclusion of the cam actuated expansion of body engaging members 62, the outer surfaces of these members are conformed to a cylindrical surface to a diameter equal to the specified internal diameter of the container body (with a slight negative tolerance). Thus, in FIG. 10-3 in conclusion of the expansion of body engagning members 62 by lowering of cam actuator 82, the interior of the container body has been accurately expanded to its specified diameter. The lower ends of body engaging members 62 are spaced upwardly slightly from the bottom of the container body to afford sufficient axial clearance for the insertion of flange 112 of the container bottom C.

In FIG. 10-4, lower mandrel 30 has been elevated to position the container bottom B closely beneath, but out of contact with, the lower end of the container body CB supported upon the upper mandrel. In this step of the process, the lower mandrel 30 is engaged with a drive belt DB which drives the lower mandrel in rotation about its axis. The drive belt DB operates along a portion of the circular path followed by the lower mandrel, see U.S. Pat. No. Re. 29,448 for details of this driving arrangement. The container bottom B is rotatively locked to lower mandrel 28 by the webs 122 and thus rotates with the lower mandrel.

The next step in the sequence of operation finds upper mandrel 28 being lowered slightly to seat the container bottom B within the bottom of the container body. Just prior to this lowering step, lower mandrel 30 passes out of engagement with drive belt DB, however, the rotary inertia of lower mandrel 30 maintains the lower mandrel in rotation as the bottom inserting step is performed. Because the container body CB carried by the upper mandrel 30 is held against rotation, the relative rotation between the engaged thermoplastic lined interior of container body CB and the rotating thermoplastic bottom B carried by the lower mandrel generates frictional heat melting the two engaged surfaces and at the same time exerts a braking action upon the rotating lower mandrel and container bottom. This braking action swiftly brings the freely rotating lower mandrel to a halt, the energy expended in the braking operation being converted to the heat which melts and, upon halting, fuses the container bottom to the container body.

In FIG. 10-6, the lower mandrel has been lowered to its original position, the now fused container body and bottom are carried above an outfeed talbe OF and cam actuating rod 82 has been elevated to permit the body engaging members 62 to be restored to their contracted position by garter spring 72.

In FIG. 10-7, upper mandrel 28 has been elevated to its original position to drop the container body CB onto the outfeed table, this separation of the container body from the upper mandrel having been assisted by stripper plate 100 (FIG. 2)

While one embodiment of the invention has been described in detail, it will be apparent to those skilled in the art that the invention may be modified. Therefore, the foregoing description is to be considered exemplary rather than limiting, and the true scope of the invention is that defined in the following claims.

What is claimed is:

1. Spin welding apparatus comprising upper and lower mandrel means mounted for vertical movement toward and away from each other along a common vertical axis, said upper mandrel means being adapted to releasably support an open ended cylindrical container body and said lower mandrel means being adapted to releasably support a container bottom of thermoplastic material having an axially upwardly projecting peripheral flange insertable into said container body with a press fit, first drive means for driving at least one of said mandrel means in rotation about said vertical axis relative to the other mandrel means, and second drive means for driving said mandrel means in movement along said vertical axis to seat said container bottom within said container body while said mandrel means are rotating relative to each other to insert and frictionally weld said container bottom in said container body; with radially expansible and contactable body engaging means mounted on the lower end of said upper mandrel means in symmetrically disposed relationship about said vertical axis, said engaging means being normally disposed in a contracted position wherein said engaging means may be axially inserted into a container body, and expanding means for radially expanding said engaging means to an expanded position wherein the radially outer surfaces of said expanding means lie on a common cylindrical surface having a diameter equal to the specified internal diameter of said container body.

2. The invention defined in claim 1 wherein said body engaging means comprises a plurality of like body engaging members, each of said engaging members having an outer surface conformed to a circumferential segment of said common cylindrical surface.

3. The invention defined in claim 2 wherein said engaging members are circumferentially spaced from each other when said engaging members are in said expanded position.

4. The invention defined in claim 3 further comprising pivot means at the upper end of each of said engaging members mounting said members for pivotal movement on said upper mandrel means about respective axes lying in a common horizontal plane and tangent to a circle centered on said vertical axis.

5. The invention defined in claim 4 further comprising spring means adjacent the lower ends of said engaging members resiliently biasing said engaging member to their contracted position.

6. Spin welding apparatus comprising lower mandrel means for supporting and rotating a thermoplastic container bottom having an upwardly projecting peripheral surface, upper mandrel means for supporting a cylindrical container body, drive means for inducing rotation of said lower mandrel about a vertical axis, and means for moving said mandrels relative to each other along said vertical axis to seat the peripheral surface of said bottom within the lower end of said body while said lower mandrel is rotating to frictionally weld said bottom to said body; wherein said upper mandrel comprises a plurality of body engaging members symmetrically disposed about said vertical axis, each of said body engaging members having an outer surface corresponding to an axially extending segment of a cylindrical surface of a diameter equal to the specified internal diameter of said cylindrical container body, mounting means mounting said body engaging members on said upper mandrel means for radial expanding and contracting movement relative to said vertical axis between an expanded position wherein the outer surfaces of said body engaging members cooperatively define the major portion of a cylindrical surface coaxial with said vertical axis and of a diameter equal to said specified internal diameter and a radially contracted position wherein said body engaging members may be axially inserted into the interior of a container body, and expanding means operable when body engaging members have been axially inserted into a container body for expanding said body engaging members to their expanded position to mount said body on said upper mandrel means and to size said body to said specified internal diameter.

7. The invention of claim 6 wherein said mounting means comprises pivot means at the upper end of each member mounting the member for pivotal movement relative to said upper mandrel means about a horizontal axis, the horizontal axes of said pivot means being tangent to a common circle centered on said vertical axis, and spring means coupled to said members adjacent to the lower ends thereof resiliently biasing said members to said contracted position.

8. The invention defined in claim 7 wherein said expanding means comprises a cam member mounted in said upper mandrel means for vertical movement relative thereto, said cam member having a plurality of cam surfaces inclined relative to said vertical axis, and actuating surfaces on the interior of the respective members adjacent the lower ends thereof slidably engaged with the respective cam surfaces to cause expanding pivotal movement of said members upon vertical movement of said cam member in a first direction.

9. Spin welding apparatus comprising upper and lower mandrel means mounted for relative movement along a vertical axis, said upper mandrel means being adapted to releasably support a container upper part and said lower mandrel means being adapted to releasably support a container lower part having a thermoplastic peripheral surface adaptable to axially mate with said upper part with an interference fit, first drive means for driving said mandrel means in relative movement along said axis to telescope said upper and lower parts into mating relation, second drive means for driving at least one of said mandrel means in rotation about said axis relative to the other mandrel means to frictionally weld said surfaces, means mounted on an end of one of said mandrel means and operable cyclically in conjunction with said drive means for radially expanding one of said parts to create and/or ensure said fit.

* * * * *